United States Patent [19]

Schroeder et al.

[11] 3,917,743

[45] Nov. 4, 1975

[54] COPOLYETHERESTER BLENDS

[75] Inventors: Herman Elbert Schroeder, Hockessin; James Richard Wolfe, Jr., Wilmington, both of Del.

[73] Assignee: E. I. Du Pont de Nemours & Company, Wilmington, Del.

[22] Filed: Mar. 7, 1974

[21] Appl. No.: 448,995

[52] U.S. Cl. ........ 260/860; 260/45.8 N; 260/45.9 R; 260/75 T; 260/857 PE; 260/857 PG
[51] Int. Cl.² .......................................... C08L 67/00
[58] Field of Search .................................... 260/860

[56] References Cited
UNITED STATES PATENTS

| | | | |
|---|---|---|---|
| 3,652,713 | 3/1972 | Okazaki | 260/860 |
| 3,652,714 | 3/1972 | Berger | 260/860 |
| 3,663,653 | 5/1972 | Frohlich | 260/860 |
| 3,701,755 | 10/1972 | Sumoto | 260/75 R |
| 3,766,146 | 10/1973 | Witsiepe | 260/75 R |
| 3,784,520 | 1/1974 | Hoeschele | 260/860 |

*Primary Examiner*—Paul Lieberman

[57] ABSTRACT

A substantially uniform blend of (A) at least one copolyetherester having a melting point of at least 120°C. which is prepared from a dicarboxylic acid, a low molecular weight diol and poly(tetramethylene oxide) glycol and (B) at least one polyetherester, which may be a copolymer. If a polyetherester is to be utilized it is prepared from poly(tetramethylene oxide) glycol and a dicarboxylic acid. If a polyetherester copolymer is to be utilized it is prepared from a dicarboxylic acid, a low molecular weight diol and poly(tetramethylene oxide) glycol. In any event, component (B) must be noncrystalline above 0°C. and have an inherent viscosity above about 0.3.

Component (B) will comprise about 5–50 weight percent of the blend and component (A) about 95–50 weight percent. Optionally up to about 5 percent of an antioxidant may also be present.

13 Claims, No Drawings

COPOLYETHERESTER BLENDS

BACKGROUND OF THE INVENTION

Linear copolyetheresters have been introduced heretofore for various purposes, particularly for the production of films and fibers, but the known polymers of this type have not been as effective as would be desired for certain applications. For instance, when utilized as a fabric coating such copolyetheresters tended to need additional softening to make them practical. The softening has been provided in the past by the addition of plasticizers. These plasticizers have presented a problem in that although they successfully softened the copolyetherester they also reduced several desirable characteristics such as tear strength and melting point to levels which were not considered to be satisfactory for fabric coating and other uses such as auto trim and vehicle bumpers. In addition, conventional plasticizers when used in amounts sufficient to effect the required softening often bleed from the softened copolyetherester or are lost by vaporization because of limited compatibility. Further, conventional plasticizers migrate to other materials in contact with plasticized copolyetherester compositions. Thus a need exists for a softer copolyetherester which retains such desirable physical characteristic and avoids the other problems associated with conventional plasticizers.

SUMMARY OF THE INVENTION

According to this invention there is provided an improved copolyetherester-containing blend which has the desired softness and also possesses the other desired characteristics, e.g., satisfactory tear strength. In addition the melting point of the blend is sufficiently high, at least 100°C., as determined by a differential scanning calorimeter, so as not to restrict its use. The blend consists essentially of at least two components. Component (A) must have a melting point of at least about 120°C. and consists essentially of a multiplicity of recurring intralinear long-chain and short-chain ester units connected head-to-tail through ester linkages, said long-chain ester units being represented by the following structure:

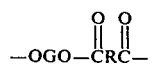

(a)

and said short-chain ester units being represented by the following structure:

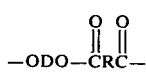

(b), wherein:
G is a divalent radical remaining after removal of terminal hydroxyl groups from poly(tetramethylene oxide) glycol having a molecular weight between about 400 and 6000.
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250, with the provisos that the short-chain ester units constitute about 15–95% by weight, preferably 25–90% by weight and most preferably 45–65 percent by weight of the copolyetherester and, ergo, the long-chain ester units constitute about 5–85% by weight, preferably 10–75% by weight and most preferably 35–55% by weight of the copolyetherester.

Component (A) is blended with a second component designated as (B). Component (B) may either be a polyetherester or a copolyetherester. In any case component (B) must be noncrystalline above 0°C. and have an inherent viscosity above about 0.3. If component (B) is to be a polyetherester and not a copolymer it will consist essentially of a multiplicity of long-chain ester units having the formula:

wherein
G is a divalent radical remaining after removal of terminal hydroxyl groups from poly(tetramethylene oxide) glycol having a molecular weight between about 400 and 6000; and
R is a divalent radical remaining after removal of carboxyl groups from a dicarboxylic acid having a molecular weight less than about 300.

Alternatively, component (B) may be a copolyetherester polymer which consists essentially of a multiplicity of recurring intralinear long-chain and short-chain ester units connected head-to-tail through ester linkages, said long-chain ester units being represented by the following structure:

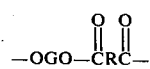

(a)

and said short-chain ester units being represented by the following structure:

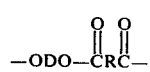

(b), wherein:
G is a divalent radical remaining after removal of terminal hydroxyl groups from poly(tetramethylene oxide) glycol having a molecular weight between about 400 and 6000.
R is a divalent radical remaining after removal of carboxyl groups from a dicarboxylic acid having a molecular weight less than about 300; and
D is a divalent radical remaining after removal of hydroxyl groups from a low molecular weight diol having a molecular weight less than about 250.

In the event the copolyetherester is utilized as component (B) it must contain sufficient poly(tetramethylene oxide) glycol so that the copolyetherester polymer will be noncrystalline above 0°C.

One skilled in the art will be able to calculate or determine the ratio of constituents which will produce that result without any great difficulty. Typically, if component (B) is a copolyetherester it will contain at least 15% by weight long-chain segments, preferably about 40–90% by weight long-chain segments.

The inherent viscosity of component (B) which is a polymeric softening agent must be more than about 0.3 as measured in meta-cresol at 30°C., preferably about 0.3 to 3.0 and most preferably about 0.5 to 2.5.

About 50–95 weight percent of the blend must be component (A) and 50–5 percent of the blend component (B), preferably 60–80 percent is component (A) and 20–40 percent component (B).

Optionally, the blend may contain an effective amount, e.g., 0.5 to 5 weight percent of an antioxidant, preferably 4,4'-bis($\alpha,\alpha$-dimethylbenzyl) diphenylamine.

DETAILED DESCRIPTION

The term "long-chain ester units" as applied to units in the copolyetherester polymer chain of component (A) refers to the reaction product of a long-chain glycol with a dicarboxylic acid. Such "long-chain ester units," which are a repeating unit in the copolyetheresters used in this invention, correspond to formula (a) above. The long-chain glycols are polymeric glycols having terminal (or as nearly terminal as possible) hydroxy groups and a molecular weight from about 400–6000. The long-chain glycols used to prepare the copolyetheresters of this invention are poly(tetramethylene oxide) glycols. Copolymers thereof containing up to about 20 mole percent of alkylene oxide units other than the tetramethylene oxide units can also be used.

The term "short-chain ester units" as applied to units in the polymer chain of component (A) refers to low molecular weight compounds or polymer chain units having molecular weights less than about 550. They are made by reacting a low molecular weight diol (below about 250) with a dicarboxylic acid to form ester units represented by formula (b) above.

Included among the low molecular weight diols which react to form short-chain ester units are aliphatic, cycloaliphatic, and aromatic dihydroxy compounds. Preferred are diols with 2–15 carbon atoms such as ethylene, propylene, tetramethylene, pentamethylene, 2,2-dimethyltrimethylene, hexamethylene, and decamethylene glycols, dihydroxy cyclohexane, cyclohexane dimethanol, resorcinol, hydroquinone, 1,5-dihydroxy naphthalene, etc. Especially preferred are aliphatic diols containing 2–8 carbon atoms. Included among the bis-phenols which can be used are bis(p-hydroxy) diphenyl, bis(p-hydroxyphenyl) methane, and bis(p-hydroxyphenyl) propane. Equivalent ester-forming derivatives of diols are also useful (e.g., ethylene oxide or ethylene carbonate can be used in place of ethylene glycol). The term "low molecular weight diols" as used herein should be construed to include such equivalent ester-forming derivatives; provided, however, that the molecular weight requirement pertains to the diol only and not to its derivatives.

Dicarboxylic acids which are reacted with the foregoing long-chain glycols and low molecular weight diols to produce the copolyesters of this invention are aliphatic, cycloaliphatic, or aromatic dicarboxylic acids of a low molecular weight, i.e., having a molecular weight of less than about 300. The term "dicarboxylic acids" as used herein, includes equivalents of dicarboxylic acids having two functional carboxyl groups which perform substantially like dicarboxylic acids in reaction with glycols and diols in forming copolyester polymers. These equivalents include esters and ester-forming derivatives, such as acid halides and anhydrides. The molecular weight requirement pertains to the acid and not to its equivalent ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthalene dicarboxylic acid, 4,4'-bicyclohexyl dicarboxylic acid, decahydro-2,6-naphthalene dicarboxylic acid, 4,4'-methylenebis-(cyclohexane carboxylic acid), 3,4-furan dicarboxylic acid, and 1,1-cyclobutane dicarboxylic acid. Preferred aliphatic acids are cyclohexane-dicarboxylic acids and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl) methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthrene dicarboxylic acid, anthracene dicarboxylic acid, 4,4'-sulfonyl dibenzoic acid, and $C_1$–$C_{12}$ alkyl and ring substitution derivatives thereof, such as halo, alkoxy, and aryl derivatives. Hydroxyl acids such as p($\beta$-hydroxyethoxy) benzoic acid can also be used providing an aromatic dicarboxylic acid is also present.

Aromatic dicarboxylic acids are an especially preferred class for preparing the component (A) copolyetherester polymers of this invention. Among the aromatic acids, those with 8–16 carbon atoms are preferred, particularly terephthalic and isophthalic acids and their dimethyl derivatives.

In preparing component (A), it is preferred that at least about 50% of the short segments are identical and that the identical segments form a homopolymer in the fiber-forming molecular weight range (molecular weight > 5000) having a melting point of at least 150°C. and preferably greater than 200°C. Copolyetheresters meeting these requirements exhibit a useful level of properties such as tensile strength and tear strength. Polymer melting points are conveniently determined by differential scanning calorimetry.

In general, the short-chain ester units will constitute about 15–95 weight percent of the copolyetherester corresponding to component (A). The remainder of the copolyetherester will be the long segments, ergo the long segment will comprise about 5–85 weight percent of the copolyetherester. Copolyetheresters in which the short-chain units comprise 25–90 weight percent with 10–75 weight percent long-chain units are preferred. The resulting copolyetherester utilized as component (A) should have a melting point of at least about 120°C.

Preferred copolyetheresters for component (A) as indicated above which are blended by the process of this invention are those prepared from dimethyl terephthalate, 1,4-butanediol or ethylene glycol, and poly(tetramethylene oxide) glycol having a molecular weight of about 600–2000. Optionally, up to about 30 mole percent and preferably 5–25 mole percent of the dimethyl terephthalate in these polymers can be replaced by dimethyl phthalate or dimethyl isophthalate.

The copolyetherester designated as component (A) is blended with an effective amount of component (B), a non-crystalline polyetherester polymer or copolymer, to achieve the resulting blend which has the desired characteristics; namely, the desired level of softness combined with good tear strength and a high melting point, e.g., about 100°–250°C. Such a blend is particularly useful for coating fabrics.

Component (B) must be noncrystalline above 0°C. and have an inherent viscosity of at least about 0.3 at 30°C. in m-cresol. It may consist essentially of the long-chain polyetherester units represented by formula (a) above or it may be a copolyetherester which consists essentially of a multiplicity of recurring intralinear long-chain and short-chain ester units connected head-to-tail through ester linkages. The long-chain ester units are represented by (a) above and the short-chain ester units are represented by (b) above. The dicarboxylic acids and low molecular weight diols used in component (B) have been described herein with reference to component (A) and need not be described again. It is sufficient to say that enough long-chain ester units, which must be based on polytetramethylene ether glycol, are present in the component (B) polymer or copolymer so that its melting point is depressed to the desired level.

If a copolyetherester is utilized as component (B) the long chain segments will generally represent at least 15% by weight of the copolyetherester, preferably 40–90%.

Preferred copolyetheresters for component (B) are those prepared from dimethyl phthalate or dimethyl adipate, 1,4-butanediol or ethylene glycol and poly(tetramethylene oxide) glycol having a molecular weight of about 600–2000. Preferred polyetheresters are those prepared from poly(tetramethylene oxide) glycol having a molecular weight of about 600–2000 and dimethyl terephthalate, isophthalate, phthalate or adipate. As indicated hereinbefore copolyetheresters used as component (B) should contain at least 15% and preferably 40–90% by weight of long-chain segments.

With regard to the manufacture of the copolyetherester, or polyetheresters, they may be made by a conventional ester interchange reaction. A preferred procedure for component (A) involves heating the dicarboxylic acid, e.g., dimethyl ester of terephthalic acid with a long-chain glycol, e.g., poly(tetramethylene oxide) glycol having a molecular weight of about 600–2000 and a molar excess of diol, e.g., 1,4-butanediol in the presence of a catalyst at about 150°–260°C. and a pressure of 0.5 to 5 atmospheres, preferably ambient pressure, while distilling off methanol formed by the ester interchange. Depending on temperature, catalyst, glycol excess, and equipment, this reaction can be completed within a few minutes, e.g., 2 minutes to a few hours, e.g., 2 hours.

Concerning the molar ratio of reactants used in preparing component (A), at least about 1.1 mole of diol should be present for each mole of acid, preferably at least about 1.25 mole of diol for each mole of acid. The long-chain glycol should be present in the amount of about 0.0025 to 0.85 mole per mole of dicarboxylic acid, preferably 0.01 to 0.6 mole per mole of acid.

This procedure results in the preparation of a low molecular weight prepolymer which can be carried to the high molecular weight copolyetherester of this invention by the procedure described below. Such prepolymers can also be prepared by a number of alternate esterification or ester interchange processes; for example, the long-chain glycol poly(tetramethylene oxide) glycol can be reacted with a high or low molecular weight short-chain ester homopolymer or copolymer in the presence of catalyst until randomization occurs. The short-chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides, or acid chlorides, for example, with diols or by other processes such as reaction of the acids with cyclic ethers or carbonates. Obviously, the prepolymer might also be prepared by running these processes in the presence of the long-chain glycol.

The resulting prepolymer is then carried to high molecular weight by distillation of the excess of short chain diol. This process is known as "polycondensation."

Additional ester interchange occurs during this polycondensation which serves to increase the molecular weight and to randomize the arrangement of the copolyetherester units. Best results are usually obtained when this final distillation or polycondensation is run at less than about 5 mm. pressure and about 200°–270°C. for less than about 3 hours, e.g., 0.5 to 2.5 hours.

Most practical polymerization techniques rely upon ester interchange to complete the polymerization reaction. In order to avoid excessive hold time at high temperatures with possible irreversible thermal degradation, a catalyst for the ester interchange reaction should be employed. While a wide variety of catalysts can be employed, organic titanates such as tetrabutyl titanate used alone or in combination with magnesium or calcium acetates are preferred. Complex titanates, such as $Mg[HTi(OR)_6]_2$, derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

The catalyst should be present in the amount of 0.005 to 0.2% by weight based on total reactants.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Both batch and continuous methods can be used for any stage of copolyetherester polymer preparation. Polycondensation of prepolymer can also be accomplished in the solid phase by heating divided solid prepolymer in a vacuum or in a stream of inert gas to remove liberated low molecular weight diol. This method has the advantage of reducing degradation because it must be used at temperatures below the softening point of the prepolymer.

In general, dicarboxylic acids or their derivatives and the polymeric glycol are incorporated into the final product in the same molar proportions as are present in the ester interchange reaction mixture. In the case of phthalic acid or its esters, there is a tendency for phthalic anhydride to form and sublime from the system so that the amount of phthalate units in the final polymer is best estimated by analysis. The amount of low molecular weight diol actually incorporated corresponds to the difference between the moles of diacid and polymeric glycol present in the reaction mixture. When mixtures of low molecular weight diols are employed, the amounts of each diol incorporated are largely a function of the amounts of the diols present, their boiling points, and relative reactivities. The total amount of diol incorporated is still the difference between moles of diacid and polymeric glycol.

The above described techniques for forming the component (A) copolyetheresters are equally applicable to the preparation of component (B) which may be a polyetherester or a copolyetherester. It should be noted, however, that copolyetheresters or polyetheresters based on phthalic acid require longer reaction times in the polycondensation step., i.e., about 1–4 hours rather than 0.5–2.5 hours which is sufficient for most polymers.

The most preferred copolyetherester or polyetherester compositions also contain 0.5 to 5 weight percent of an antioxidant, such as 4,4'-bis($\alpha,\alpha$-dimethylbenzyl)diphenylamine, 1,3,5-tris(3,5-di-tert-butyl-4-hydroxyhydrocinnamoyl) hexahydro-s-triazine or 1,6-bis[3-(3,5-di-tert-butyl-4-hydroxyphenyl)propionamide] hexane. Optionally they may also contain as a stabilizer, e.g., 0.5 to 3.0 weight percent of amide linkages, preferably provided by a copolymer of polycaprolactam and polyhexamethylene adipamide or terpolymer of polycaprolactam, polyhexamethylene adipamide and polyhexamethylene sebacamide.

The antioxidant and the amide may be added at any time during the preparation of the copolyetherester or polyetherester or following its preparation. Preferably an antioxidant should be present during the polycondensation aspect of the reaction in an amount of at least about 0.2 percent by weight based on the estimated yield of copolyetherester or polyetherester product, preferably in an amount of 0.5 to 3.0 percent by weight. It is preferred that a suitable antioxidant be present at any point in the process where the poly(tetramethylene oxide) glycol is exposed to elevated temperatures, e.g., above about 100°C. The antioxidant, depending on its melting point, may be added as a solid, a molten liquid, or as a solution or dispersion in one or more of the reactants. In batch operation, it is conveniently added as a solid or as a solution or dispersion in the diol or the poly(tetramethylene oxide) glycol at the time of charging the reactor. In continuous operation, the antioxidant is most conveniently added as a solution or dispersion in the diol and/or glycol entering the process. The antioxidant may, of course, be introduced at later stages in the process and even after preparation of the copolyetherester is complete. It is usually convenient to add the total amount of antioxidant desired in the finished copolyetherester during its preparation; however, additional amounts of antioxidant can be added to the finished copolyetherester by melt blending. In preparing the blends of this invention, all or additional amounts of stabilizers can be conveniently incorporated during the formation of the blends. It is, however, still preferred to protect components (A) and (B) with stabilizers during their preparation.

The resulting components (A) and (B) may be blended by any of several well-known techniques; in fact, blending technique is not critical. It is necessary, however, that a substantially uniform blending of the components take place in order to produce the most desirable homogeneous blend. For best results, in preparing the blends of this invention, the components must be thoroughly and uniformly blended, otherwise localized areas will differ in properties. The compositions may be prepared by heating the components to a temperature sufficient to soften them and agitating until a uniform blend is formed. The temperature required to soften or melt the components depends on the particular copolyetheresters or copolyetherester and polyetherester utilized. Generally, it will be in the range of about 100° to 270°C., preferably between about 120° and 250°C. Needless to say, depending on the amount and nature of the short-chain segments present in the component (A) there will be a good deal of variation in the broad range; operating most efficiently within such temperature range will present no difficulty for one skilled in the art. The blending temperature should be above the melting point of component (A).

The pressure utilized during blending may vary broadly; but in most instances ambient pressure is satisfactory. On occasion higher or lower pressures may be inherent due to the nature of the equipment in which blending is performed.

The mixing or blending of the plasticizer and the copolyetherester is preferably accomplished by means of extrusion blending. Suitable devices for the blending include single-screw extruders, twin-screw extruders, internal mixers such as the Banbury Mixer, heated rubber mills (electric or oil heat) or a Farrell continuous mixer. Injection molding equipment can also be used to accomplish blending just prior to molding, but care must be taken to provide sufficient time and agitation to insure uniform blending prior to molding.

The blends must contain at least about 5% by weight of the noncrystalline component (B) in order to exhibit significant changes in physical properties compared to unblended component (A). In general, blends containing more than 50% by weight of component (B) are not of interest because of their relatively poor physical properties. Blends containing more than 50% by weight of component (B) can be readily prepared, however, and may have use in a limited number of applications, such as potting compositions.

The resulting blends may be utilized as previously indicated in fabric coatings, etc.

All parts, proportions and percentages disclosed herein are by weight unless otherwise indicated.

The following examples further illustrate the invention:

EXAMPLES

The following ASTM methods are employed in determining the properties of the polymers prepared in the Examples which follow:

| | |
|---|---|
| Modulus at 100% elongation*, $M_{100}$ | D412 |
| Modulus at 300% elongation*, $M_{300}$ | D412 |
| Tensile at Break*, $T_B$ | D412 |
| Elongation at Break*, $E_B$ | D412 |
| Permanent Set at Break*, $P.S._B$ | D412 |
| Hardness, Shore D | D1484 |
| Tear Strength** | D470 |
| Clash-Berg Torsional Stiffness | D1043 |

*Cross-head speed 2″/minute if not stated otherwise.
**Modified by use of 1.5″ × 3″ sample with 1.5″ cut on the long axis of the sample. This configuration prevents "necking down" at the point of tearing. A cross-head speed of 50″/minute is used.

Inherent viscosities of the polymers in the following examples are measured at 30°C. at a concentration of 0.1g./dl. in m-cresol.

Polymer melting points are determined by means of a differential scanning calorimeter (DSC).

COMPONENTS (A) AND (B)

These polymers are prepared substantially by the following general procedure. Materials required for preparing the polymer desired are placed in a 400 ml reaction flask fitted for distillation. A stainless steel stirrer with a paddle cut to conform with the internal radius of the flask and with a circular baffle one-half inch less in diameter than the inside of the flask is positioned with the paddle at the bottom of the flask and the baffle about 2½ inches above the bottom of the flask. Air in the flask is replaced with nitrogen. The flask is placed in an oil bath at 160°C. After the reaction mixture liquifies, 0.36 ml of catalyst solution is added and agitation is initiated. Methanol distills from the reaction mixture as the temperature of the oil bath is slowly raised to 250°C. over a period of about 30–40 minutes. When the temperature reaches 250°C., the pressure is gradually reduced to 0.1 mm of Hg or less over a period of about 50 minutes. In preparing polymers based on dimethyl phthalate or phthalic anhydride, the reaction mass is held at 250°C. for an hour prior to reducing the pressure. The polymerization mass is agitated at 250°–258°C./0.03 mm of Hg for about 100 minutes. (Polymers based on phthalates may require up to 4 hours.) The resulting viscous molten product is scraped from the flask in a nitrogen (water and oxygen free) atmosphere and allowed to cool.

The catalyst solution required is prepared as follows. Magnesium diacetate tetrahydrate is dried for 24 hours at 150°C. under vacuum with a nitrogen bleed. A mixture of 11.2 gm of the dried magnesium diacetate and 200 ml methanol is heated at reflux for 2 hours. The mixture is cooled and 44.4 ml of tetrabutyl titanate and 150 ml of 1,4-butanediol are added with stirring. COMPONENT (A-1) is prepared from the following materials:

| | |
|---|---|
| Polytetramethyleneether glycol: number average molecular weight about 975 | 10.75 gm |
| 1,4-Butanediol | 28.0 gm |
| Dimethyl terephthalate | 36.45 gm |
| Dimethyl phthalate | 3.65 gm |
| 4,4′-bis (alpha, alpha-dimethylbenzyl) diphenylamine | 0.57 gm |

Component (A-1) has an inherent viscosity of 1.25, a DSC mp. of 202°C. and Shore D hardness of about 63. COMPONENT (A-2) is prepared from the following materials:

| | |
|---|---|
| Polytetramethyleneether glycol; number average molecular weight about 975 | 19.25 gm |
| 1,4-Butanediol | 18.25 gm |
| Dimethyl terephthalate | 30.0 gm |
| 4,4′-bis (alpha, alpha-dimethylbenzyl) diphenylamine | 0.53 gm |

Component (A-2) has an inherent viscosity of 1.43, a DSC mp. of 204°C. and a Shore D hardness of about 55. COMPONENT (A-3) is prepared from the following materials:

| | |
|---|---|
| Polytetramethyleneether glycol; number average molecular weight about 975 | 44.0 gm |
| 1,4-Butanediol | 36.5 gm |
| Dimethyl terephthalate | 44.0 gm |
| Dimethyl isophthalate | 12.35 gm |
| 4,4′-bis($\alpha,\alpha$-dimethyl) diphenylamine | 1.0 gm |

Component (A-3) has an inherent viscosity of 1.61, a DSC mp. of 156°C. and a Shore D hardness of about 40. COMPONENT (B-1) is prepared from the following materials:

| | |
|---|---|
| Polytetramethyleneether glycol; number average molecular weight about 977 | 22.75 gm |
| 1,4-Butanediol | 15.8 gm |
| Dimethyl phthalate | 27.2 gm |
| 4,4′-bis ($\alpha,\alpha$-dimethylbenzyl) diphenylamine | 0.5 gm |

Component (B-1) has an inherent viscosity of 0.56 and a DSC mp. of less than 0°C. Analysis by saponification indicates a phthalate content which corresponds to 45% by weight butylene phthalate units and 55% by weight polytetramethyleneether glycol phthalate units. COMPONENT (B-2) is prepared from the following materials:

| | |
|---|---|
| Polytetramethyleneether glycol; number average molecular weight about 977 | 30.1 gm |
| 1,4-Butanediol | 12.15 gm |
| Dimethyl adipate | 21.0 gm |
| 4,4′-bis ($\alpha,\alpha$-dimethylbenzyl) diphenylamine | 0.5 gm |

Component (B-2) has an inherent viscosity of 1.25 and a DSC mp. of less than 0°C. Analysis indicates the polymer contains 27% by weight butylene adipate units and 73% by weight polytetramethyleneether glycol adipate. COMPONENT (B-3) is prepared from the following materials:

| | |
|---|---|
| Polytetramethyleneether glycol; number average molecular weight about 977 | 45.5 gm |
| Dimethyl terephthalate | 9.0 gm |
| 4,4'-bis (α,α-dimethylbenzyl) diphenylamine | 0.5 gm |

Component (B-3) has an inherent viscosity of 0.92 and a DSC mp. of less than 0°C. COMPONENT (B-4) is prepared from the following materials:

| | |
|---|---|
| Polytetramethyleneether glycol; number average molecular weight about 977 | 22.75 gm |
| Phthalic anhydride | 20.75 gm |
| 1,4-Butanediol | 15.8 gm |
| 4,4'-bis (α,α-dimethylbenzyl) diphenylamine | 0.5 gm |

Substantially, the same general procedure described hereinbefore is employed for preparing this polymer; however, there is no methanol to distill when the reaction mass is slowly heated from 160° to 250°C. Component (B-4) has an inherent viscosity of 1.85 and a DSC mp. of less than 0°C. By analysis, the composition of this polymer is 35% by weight butylene phthalate units and 65% by weight polytetramethyleneether glycol phthalate units. COMPONENT (B-5) is prepared from the following materials:

| | |
|---|---|
| Polytetramethyleneether glycol; number average molecular weight about 977 | 27.3 gm |
| 1,4-Butanediol | 12.65 gm |
| Dimethyl phthalate | 23.55 gm |
| 4,4'-bis (α,α-dimethylbenzyl) diphenylamine | 0.5 gm |

Component (B-5) has an inherent viscosity of 1.31 and a DSC mp. of less than 0°C. By analysis, the composition of this polymer is 26% by weight butylene phthalate units and 74% by weight polytetramethyleneether glycol phthalate units. COMPONENT (B-6) is prepared from the following materials:

| | |
|---|---|
| Polytetramethyleneether glycol; number average molecular weight about 977 | 15.9 gm |
| 1,4-Butanediol | 20.55 gm |
| Dimethyl phthalate | 32.65 gm |
| 4,4'-bis (α,α-dimethylbenzyl) diphenylamine | 0.5 gm |

Component (B-6) has an inherent viscosity of 0.77 and a DSC mp. of less than 0°C. Analysis indicates the composition of this polymer to be 59% by weight butylene phthalate units and 41% by weight polytetramethyleneether glycol phthalate units.

Example 1

The following materials are placed in a 400 ml reaction kettle connected to a vacuum system:

| | |
|---|---|
| Component (A-1) | 38.5 gm |
| Component (B-1) | 16.5 gm |
| 4,4'-bis (α,α-dimethylbenzyl) diphenylamine | 0.3 gm |

A stainless steel stirrer with a paddle cut to conform with the internal radius of the flask bottom is positioned with the bottom of the paddle touching the top surface of the polymer mixture. The kettle is evacuated to less than 1 Torr and then placed in an oil bath heated to a temperature of 250° ± 5°C. After the contents of the kettle become molten, stirring is initiated. During the first 30 minutes of stirring the paddle stirrer is slowly lowered until it reaches the bottom of the kettle. Stirring is continued an additional 15 minutes at about 250°C. The molten product is scraped from the flask in a nitrogen (water and oxygen free) atmosphere and allowed to cool. Physical properties are obtained on blend samples compression molded at about 245°C. Properties of the blend are listed in Table 1 as Polymer Blend 1-A.

The blending procedure is repeated using an equal amount of Component (B-2) in place of Component (B-1). Properties of this Polymer Blend (1-B) are listed in Table 1.

The blending procedure is repeated using Component (B-3) in place of Component (B-1). Properties of this blend are also presented in Table 1 under Polymer Blend 1-C.

For comparison, the properties of unblended Component (A-1) are included in Table 1.

Table 1

| | Component (A-1) | Polymer Blend 1-A | Polymer Blend 1-B | Polymer Blend 1-C |
|---|---|---|---|---|
| $M_{100}$ (psi) | 2600 | 1580 | 1560 | 1480 |
| $M_{300}$ (psi) | 2800 | 1850 | 1960 | 1740 |
| $T_B$ (psi) | 6450 | 3320 | 3520 | 3050 |
| $E_B$ (%) | 590 | 565 | 570 | 575 |
| $P.S._B$ (%) | 420 | 310 | 355 | 350 |
| Shore D hardness | 64 | 45 | 48 | 49 |
| Clash Berg, $T_{10000°C.}$ | >25 | 1 | −4 | −4 |
| Tear strength, 50 in/min (pli) | 635 | 460 | 300 | 385 |
| DSC m.p. (°C.) | 202 | 200 | 200 | 200 |

It should be noted that the polymer blends are much softer than unblended Component (A-1), but have substantially the same melting point as the unblended polymer. In addition, the blends have good tear strengths and stress-strain properties along with improved low temperature stiffness.

Example 2

A polymer blend is prepared in a manner similar to that of Example 1 using the following materials:

| | |
|---|---|
| Component (A-2) | 38.5 gm |
| Component (B-4) | 16.5 gm |
| 4,4'-bis (α,α-dimethylbenzyl) | |

| | |
|---|---|
| diphenylamine | 0.3 gm |

Physical properties are obtained on blend samples compression molded at about 232°C. Properties are listed in Table 2 as Polymer Blend 2-A.

The blending and molding procedure is repeated using as the amorphous blending agent an equal weight poly (propylene ether) glycol sebacate of about 8000 molecular weight in place of Component (B-4). Properties of the blend are listed in Table 2 as Polymer Blend 2-B. Polymer Blend 2-B is outside the scope of this invention.

The blending and molding procedure is repeated under a nitrogen atmosphere rather than under vacuum using as the blending agent an equal weight of dipropylene glycol dibenzoate in place of Component (B-4). Properties of the blend are listed in Table 2 as Polymer Blend 2-C. Polymer Blend 2-C is outside the scope of this invention.

The properties of unblended Component (A-2) are also included in Table 2 for comparison.

Table 2

| | Component (A-2) | Polymer Blend 2-A | Polymer Blend 2-B | Polymer Blend 2-C |
|---|---|---|---|---|
| $M_{100}$ (psi) | 2110 | 1400 | 1170 | 1480 |
| $M_{300}$ (psi) | 2700 | 1720 | 1380 | 1750 |
| $T_B$ (psi) | 6400 | 3950 | 1900 | 1810 |
| $E_B$ (%) | 680 | 625 | 570 | 360 |
| $P.S._B$ (%) | 420 | 305 | 305 | 175 |
| Shore D hardness | 53 | 46 | 39 | 41 |
| Clash Berg, $T_{10000}$ (°C.) | 6 | −35 | −37 | −46 |
| Tear strength, 50 in/min (pli) | 340 | 250 | 150 | 120 |
| DSC m.p. (°C.) | 204 | 201 | 201 | 188 |

Polymer Blend 2-A is significantly softer than Component (A-2), but has substantially the same melting point. Polymer Blend 2-B, employing a conventional polymeric plasticizer, also has about the same melting point as unblended Component (A-2); however, its tear strength and stress-strain properties are quite inferior to those of Polymer Blend 2-A of this invention. When a conventional low molecular weight plasticizer is used (Polymer Blend 2-C), the melting point of the blend is lowered significantly, and all physical properties are poorer in general.

Example 3

A polymer blend is prepared in a manner similar to that of Example 1 using the following materials:

| | |
|---|---|
| Component (A-3) | 38.5 gm |
| Component (B-5) | 16.5 gm |
| 4,4′-bis (α,α-dimethylbenzyl) diphenylamine | 0.3 gm |

Physical properties are obtained on blend samples compression molded at about 216°C. Properties are listed in Table 3 as Polymer Blend 3-A.

The blending and molding procedures are repeated using the following amorphous blending agents in place of Component (B-5).

a. Component (B-6) to give Polymer Blend 3-B.
b. Poly (propylene ether) glycol sebacate of about 8000 molecular weight to give Polymer Blend 3-C, which is outside the scope of this invention. The properties of the blends and unblended Component (A-3) are presented in Table 3.

Table 3

| | Component A-3 I | Polymer Blend 3-A | Polymer Blend 3-B | Polymer Blend 3-C |
|---|---|---|---|---|
| $M_{100}$ (psi) | 1010 | 650 | 490 | 570 |
| $M_{300}$ (psi) | 1350 | 830 | 610 | 700 |
| $T_B$ (psi) | 6100 | 4250 | 3200 | 1740 |
| $E_B$ (%) | 805 | 825 | 925 | 1070 |
| $P.S._B$ (%) | 245 | 235 | 255 | 320 |
| Shore A hardness | 90 | 86 | 86 | 78 |
| Clash Berg, $T_{10000}$ (°C.) | −43 | −52 | −43 | −52 |
| Tear strength, 50 in/min (pli) | 365 | 220 | 215 | 150 |
| DSC m.p. (°C.) | 156 | 146 | 152 | 147 |

It should be noted again that the conventional polymeric plasticizer outside this invention yields blends (3-C) having inferior tear and tensile strengths relative to polymer blends within the invention (3-A and 3-B).

What is claimed is:

1. A substantially uniform blend having a melting point of at least 100°C. composed of (A) 50–95 percent by weight of a copolyetherester having a DSC melting point of at least 120°C. and consisting essentially of a multiplicity of recurring long-chain ester units and short-chain ester units joined head-to-tail through ester linkages, said long-chain ester units being represented by the formula

I

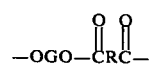

and said short-chain units being represented by the formula

II

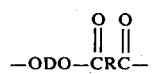

where G is a divalent radical remaining after the removal of terminal hydroxyl groups from a poly(tetramethylene oxide) glycol having a molecular weight of about 400 to 6000; R is a divalent radical remaining after removal of carboxyl groups from a dicarboxylic acid or derivative thereof having a molecular weight less than about 300 and D is a divalent radical remaining after removal of hydroxyl groups from a diol having a molecular weight less than about 250, provided said short-chain ester units amount to about 15–95% by weight of said copolyetherester and (B) 50–5 percent by weight of polymeric softener selected from the group consisting of (1) polyetherester units represented by the formula I 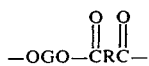

where G is a divalent radical remaining after the removal of terminal hydroxyl groups from a poly(tetramethylene oxide) glycol having a molecular weight of about 400 to 6000; and R is a divalent radical remaining after removal of carboxyl groups from dicarboxylic acid having a molecular weight of less than about 300 and (2) copolyetherester compositions consisting essentially of a multiplicity of recurring long-chain ester units and short-chain ester units joined head-to-tail to ester linkages, said long-chain ester units being present in an amount of at least 15% by weight and being represented by the formula I 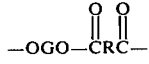

and said short-chain units being represented by the formula

II 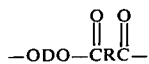

where G is a divalent radical remaining after the removal of terminal hydroxyl groups from a poly(tetramethylene oxide) glycol having a molecular weight of about 400 to 6000; R is a divalent radical remaining after removal of carboxyl groups from a dicarboxylic acid having a molecular weight less than about 300 and D is a divalent radical remaining after removal of hydroxyl groups from a diol having a molecular weight less than about 250, with the proviso that said component (B) must have an inherent viscosity of more than about 0.3 as measured in m-cresol at 30°C. and a DSC melting point of less than 0°C.

2. The composition of claim 1 wherein component (A) amounts to about 60–80% by weight of the blend and component (B) amounts to about 40–20% by weight.

3. The composition of claim 1 wherein component (B) is a copolyetherester prepared from dimethylphthalate or dimethyl adipate, 1,4-butanediol or ethylene glycol and poly(tetramethylene oxide) glycol having a molecular weight of about 600–2000.

4. The composition of claim 1 wherein component (B) is polyetherester prepared from poly(tetramethylene oxide) glycol having a molecular weight of about 600–2000 and dimethyl terephthalate, isophthalate, phthalate or adipate.

5. The composition of claim 3 wherein the long-chain ester units of component B are present in the amount of 40 to 90% by weight.

6. The composition of claim 1 additionally containing an effective amount of an antioxidant.

7. The composition of claim 6 wherein said antioxidant is an arylamine or a hindered phenol.

8. The composition of claim 7 wherein said antioxidant is 4,4'-bis($\alpha,\alpha$-dimethylbenzyl)diphenylamine in the amount of 0.5 to 5 weight percent.

9. The composition of claim 6 wherein Component (A) is prepared from poly(tetramethylene oxide) glycol having a molecular weight of 600–2000, the diol is 1,4-butanediol and the dicarboxylic acid derivative is a mixture of dimethyl terephthalate and dimethyl phthalate or dimethyl isophthalate.

10. The composition of claim 9 wherein said dicarboxylic acid derivative is dimethyl terephthalate.

11. The composition of claim 9 wherein said diol is ethylene glycol.

12. The composition of claim 10 wherein said short-chain segment in component (A) constitutes 45–65% by weight of the copolyetherester.

13. The composition of claim 12 wherein said antioxidant is 4,4'-bis($\alpha,\alpha$-dimethylbenzyl)diphenylamine in the amount of 0.5 to 5 weight percent.

* * * * *